(12) United States Patent
Chen

(10) Patent No.: US 10,207,769 B1
(45) Date of Patent: Feb. 19, 2019

(54) BICYCLE PEDAL

(71) Applicant: Chung-I Chen, Taichung (TW)

(72) Inventor: Chung-I Chen, Taichung (TW)

( * ) Notice: Subject to any disclaimer, the term of this patent is extended or adjusted under 35 U.S.C. 154(b) by 0 days.

(21) Appl. No.: 15/858,853

(22) Filed: Dec. 29, 2017

(51) Int. Cl.
*B62M 3/08* (2006.01)

(52) U.S. Cl.
CPC ................................. *B62M 3/086* (2013.01)

(58) Field of Classification Search
CPC ................................. B62M 3/08; B62M 3/086
See application file for complete search history.

(56) References Cited

U.S. PATENT DOCUMENTS

| | | | | |
|---|---|---|---|---|
| 5,060,537 A * | 10/1991 | Nagano | ................. | B62M 3/086 36/131 |
| 5,497,680 A * | 3/1996 | Nagano | ................. | B62M 3/086 36/131 |
| 5,692,415 A * | 12/1997 | Lin | ................. | B62M 3/086 74/594.6 |
| 6,112,620 A * | 9/2000 | Chen | ................. | B62M 3/086 74/594.4 |
| 7,021,175 B1 * | 4/2006 | Xie | ................. | B62M 3/086 74/594.4 |
| 7,024,961 B2 * | 4/2006 | Hsiao | ................. | B62M 3/086 74/594.4 |
| 7,024,962 B2 * | 4/2006 | Chen | ................. | B62M 3/086 36/131 |
| 7,073,409 B2 * | 7/2006 | Ho | ................. | B62M 3/086 74/594.6 |
| 7,856,904 B2 * | 12/2010 | Lin | ................. | B62M 3/086 74/594.4 |
| 7,856,905 B2 * | 12/2010 | Hsieh | ................. | B62M 3/086 74/594.4 |
| 8,661,938 B1 * | 3/2014 | Chen | ................. | B62M 3/086 74/594.6 |
| 2004/0129110 A1 * | 7/2004 | Lin | ................. | B62M 3/086 74/594.4 |
| 2005/0081679 A1 * | 4/2005 | Chen | ................. | B62M 3/086 74/594.6 |
| 2012/0174702 A1 * | 7/2012 | Chen | ................. | B62M 3/086 74/594.6 |

FOREIGN PATENT DOCUMENTS

TW 503201 B 9/2002
TW I474949 B 3/2015

* cited by examiner

*Primary Examiner* — Adam D Rogers
(74) *Attorney, Agent, or Firm* — Muncy, Geissler, Olds & Lowe, P.C.

(57) ABSTRACT

A bicycle pedal, including: a pedal axle; a fixed portion, rotatably connected to the pedal axle, including a pedal body and a first cleat securing member fixedly attached to the pedal body, the first cleat securing member including a first securing opening; a second cleat securing member, rotatably connected to the fixed portion, including a second securing opening opposite to the first securing opening, the first and second securing openings configured for securing a cleat of a shoe; a biasing mechanism, including an adjustment mechanism movably attached to the fixed portion and an elastic member located between the second cleat securing member and the adjustment mechanism, the elastic member biasing the second cleat securing member in such a manner that the second cleat securing member tends to swing toward the first cleat securing member.

9 Claims, 10 Drawing Sheets

BICYCLE PEDAL

BACKGROUND OF THE INVENTION

Field of the Invention

The present invention relates to a pedal, and particularly to a bicycle pedal.

Description of the Prior Art

A clipless pedal of a bicycle includes a fixed cleat securing member and a movable cleat securing member oppositely mounted on a pedal body, for releasably securing a cleat of a shoe, so that the cyclist's foot can held on the bicycle pedal. Compared to the bicycle pedal without securing mechanism, it is labor-saving, good in acceleration with the clipless pedal. As a result, mountain bikes, road bikes, off-road bikes or race bikes are usually equipped with clipless pedals.

Generally, the movable cleat securing member can be adjusted, through a biasing mechanism, to vary tightness of securing the cleat. This type of clipless pedal is disclosed in TW 1474949 and TW 503201. However, in this type of clipless pedal, the biasing mechanism is mounted directly to the movable cleat securing member. As a result, the adjustment mechanism can be easily affected by impact during the cleat being securing into or releasing from the movable cleat securing member, and thus the preload caused by the adjustment mechanism can change. Additionally, between the cylindrical portion of the bicycle pedal and the fixed and movable cleat securing members are entirely hollow spaces, and thus the cleat cannot be sufficiently supported so that the cleat can disengage easily when pealed hard.

The present invention is, therefore, arisen to obviate or at least mitigate the above mentioned disadvantages.

SUMMARY OF THE INVENTION

An object of the present invention is to provide a bicycle pedal, which can stably secure a cleat of a shoe.

To achieve the above and other objects, a bicycle pedal is provided, including: a pedal axle; a fixed portion, rotatably connected to the pedal axle, including a pedal body and a first cleat securing member fixedly attached to the pedal body, the first cleat securing member including a first securing opening; a second cleat securing member, rotatably connected to the fixed portion, including a second securing opening opposite to the first securing opening, the first and second securing openings configured for securing a cleat of a shoe; a biasing mechanism, including an adjustment mechanism movably attached to the fixed portion and an elastic member located between the second cleat securing member and the adjustment mechanism, the elastic member biasing the second cleat securing member in such a manner that the second cleat securing member tends to swing toward the first cleat securing member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
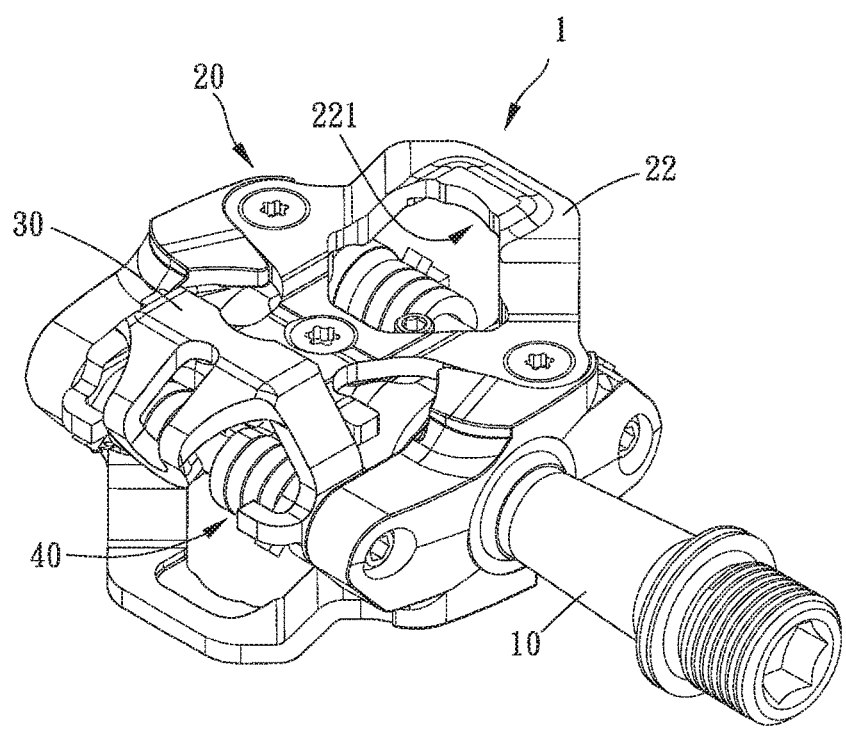
FIG. 1 is a perspective view of a bicycle pedal according to a first preferred embodiment of the present invention.
Figure 2:
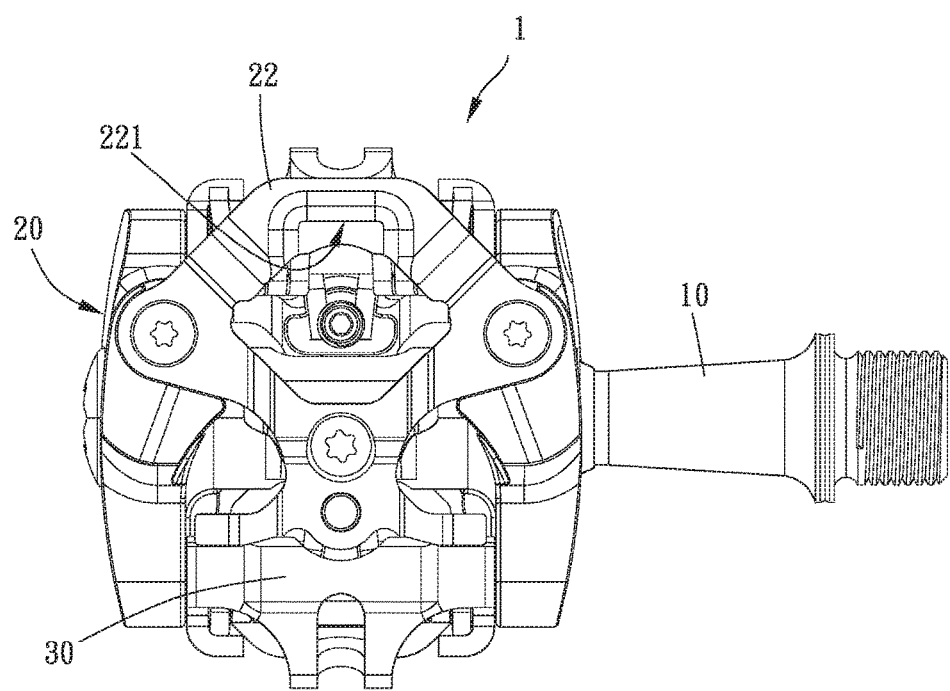
FIG. 2 is a top plane view of the bicycle pedal according to the first preferred embodiment of the present invention.
Figure 3:
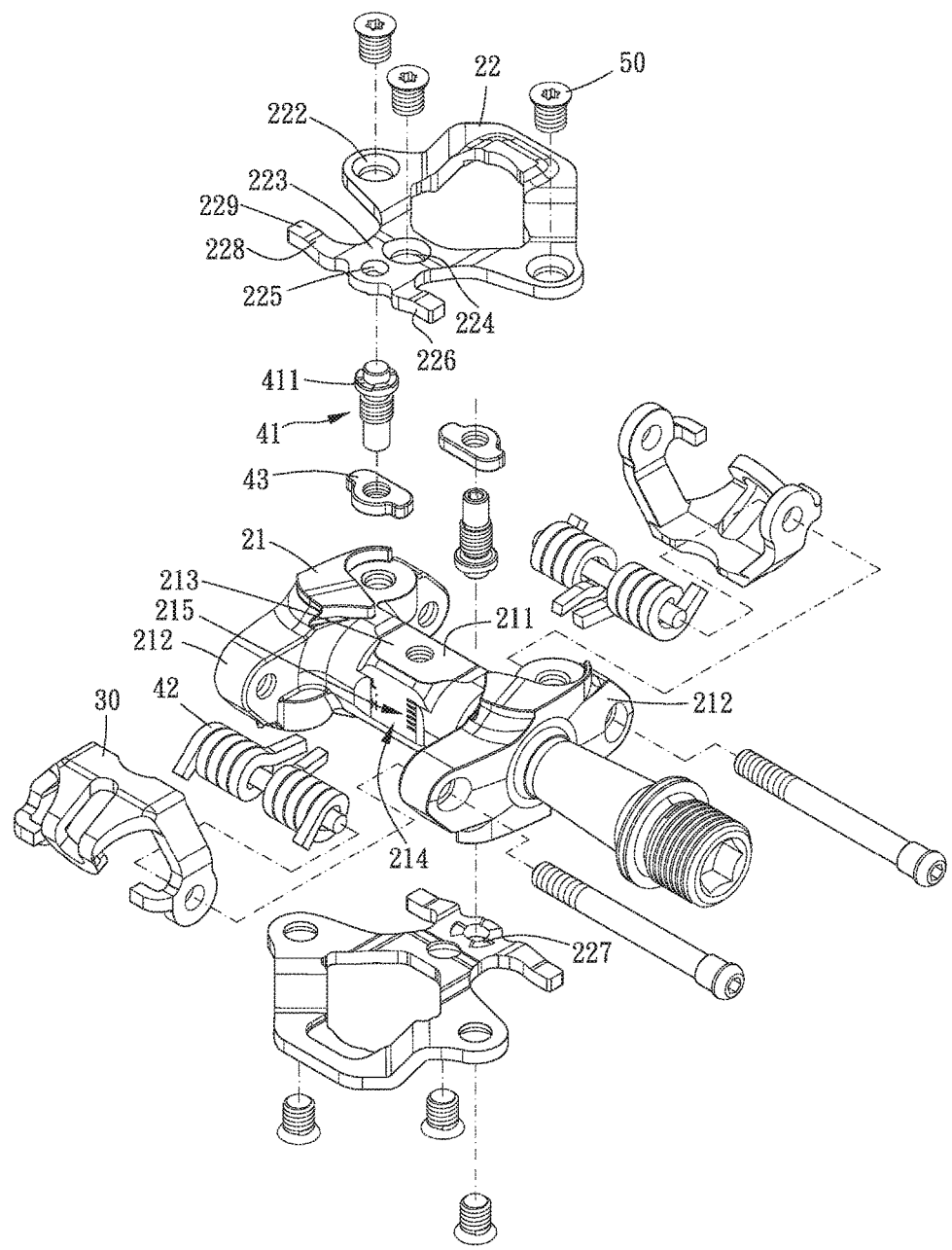
FIG. 3 is a breakdown drawing of the bicycle pedal according to the first preferable embodiment of the present invention.
Figure 4:
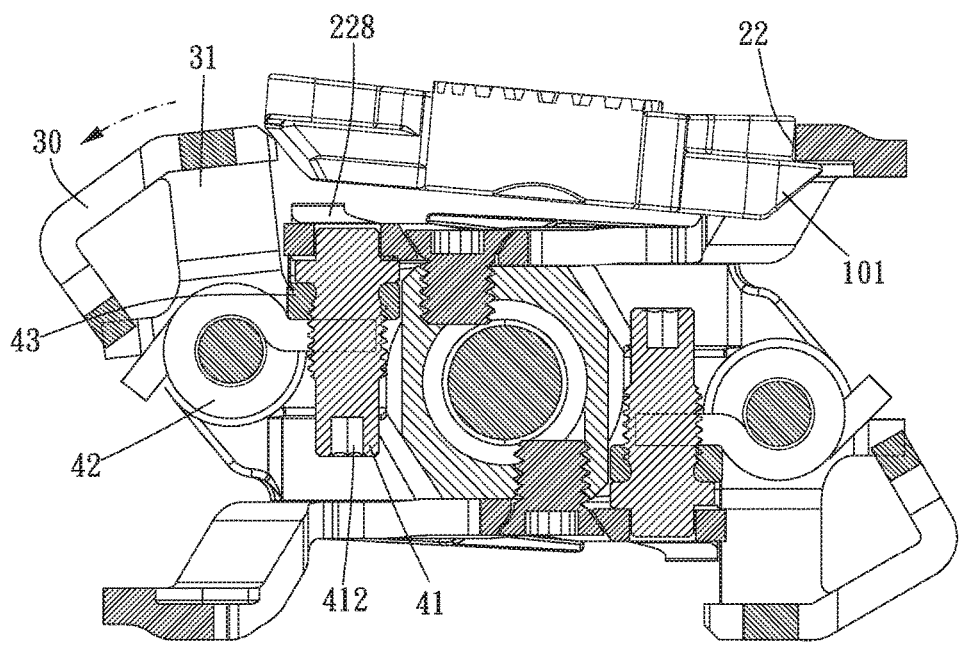
FIGS. 4 and 5 are drawings showing operation of the bicycle pedal according to the first preferable embodiment of the present invention.
Figure 5:
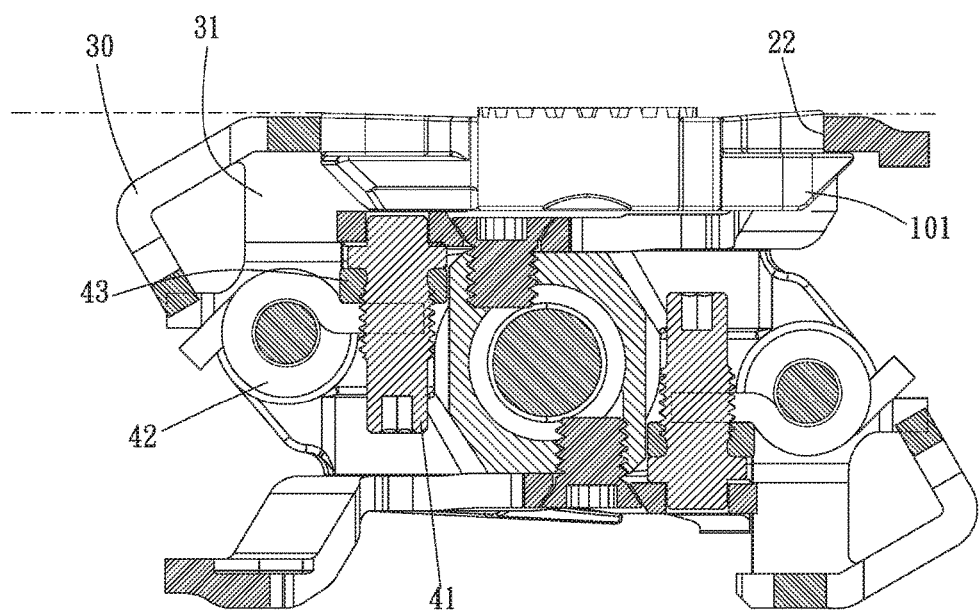
Figure 6:
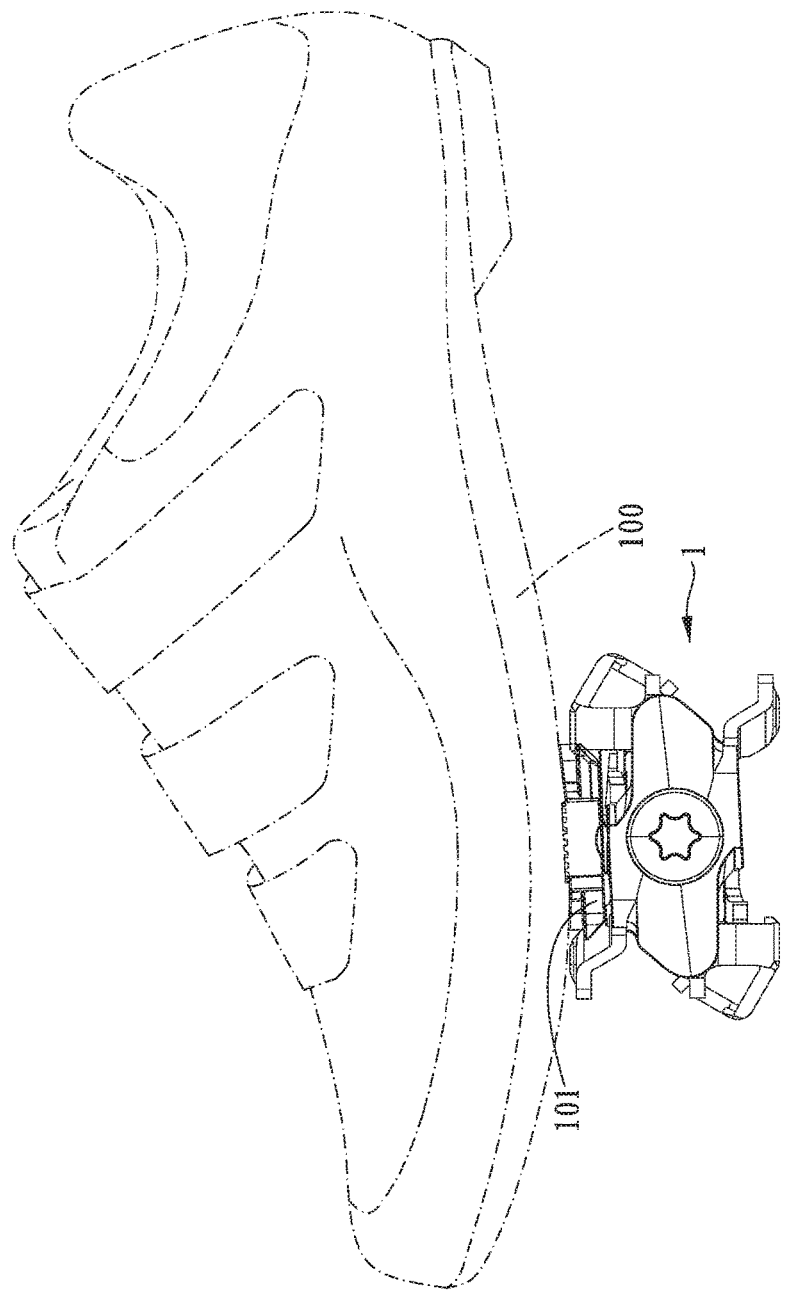
FIGS. 6 and 7 are drawings showing securing of a cleat of a shoe according to the first preferable embodiment of the present invention.
Figure 7:
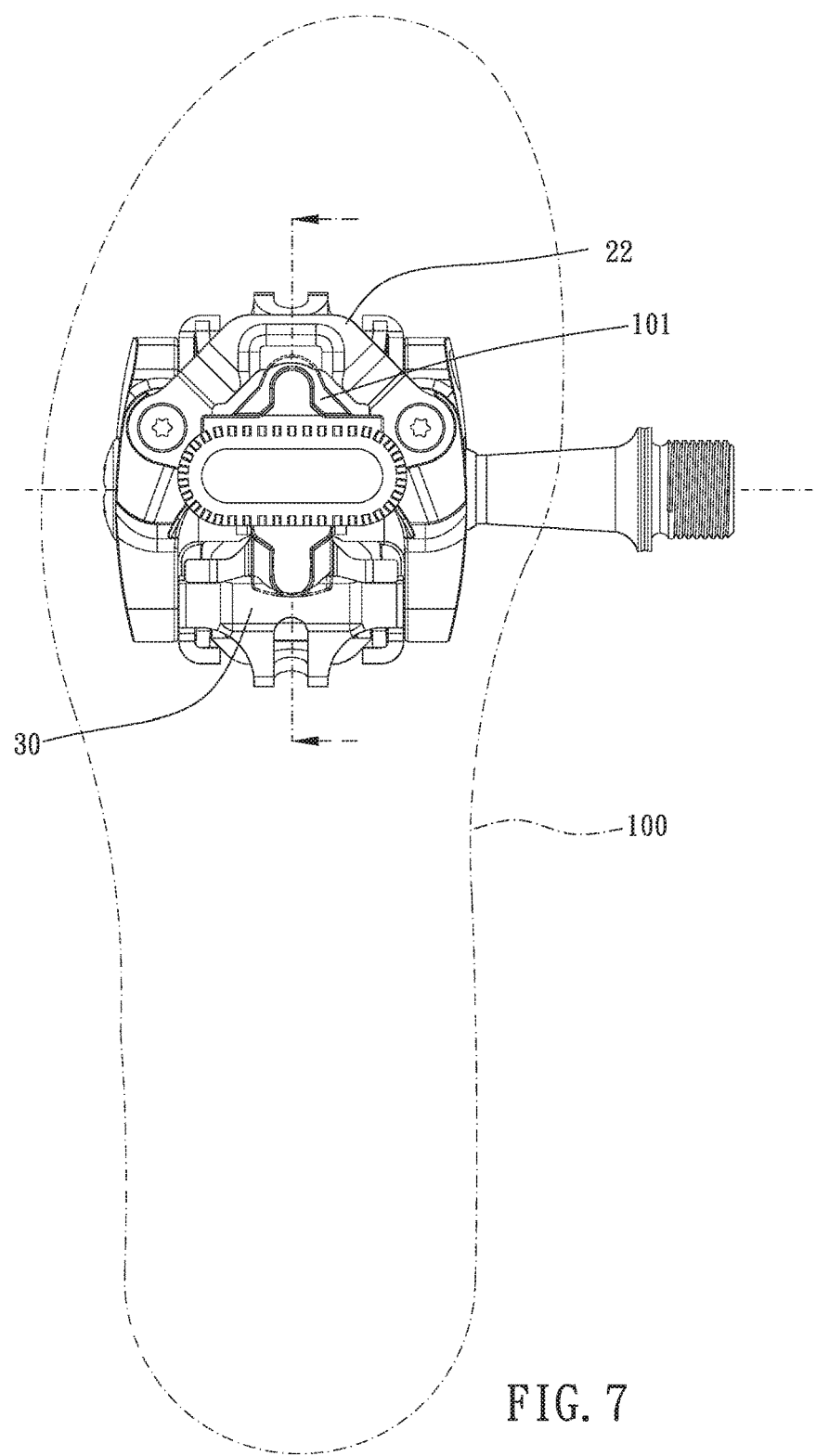

FIGS. 1-7 show a bicycle pedal according to a first preferred embodiment of the present invention. The bicycle pedal 1 includes a pedal axle 10, a fixed portion 20, a second cleat securing member 30 and a biasing mechanism 40.

One end of the pedal axle 10 is configured for being connected to a crank of a vehicle such as bicycle. The fixed portion 20 is rotatably connected to the pedal axle 10, the fixed portion 20 includes a pedal body 21 and a first cleat securing member 22 fixedly attached to the pedal body, and the first cleat securing member 22 includes a first securing opening 221. The second cleat securing member 30 is rotatably connected to the fixed portion 20, the second cleat securing member 30 includes a second securing opening 31 opposite to the first securing opening 221, and the first securing opening 221 and the second securing opening 31 are configured for securing a cleat 101 of a shoe 100. The biasing mechanism 40 includes an adjustment mechanism 41 movably attached to the fixed portion 20 and an elastic member (such as coil spring) 42 located between the second cleat securing member 30 and the adjustment mechanism 41, and the elastic member 42 the second cleat securing member 30 the first cleat securing member 22 biases the second cleat securing member 30 in such a manner that the second cleat securing member 30 tends to swing toward the first cleat securing member 22. Whereby, the cleat 101 of the shoe 100 can be stably secured. It is noted that, two pedaling sides of the bicycle pedal 1 preferably each include one set of first cleat securing member 22, second cleat securing member 30 and biasing mechanism 40, and thus the cleat 101 of the shoe 100 can be secured on any of the two pedaling sides.

The pedal body 21 includes a cylindrical portion 211 through which the pedal axle 10 is disposed and two side portions 212 radially extending from two ends of the cylindrical portion 211. The first cleat securing member 22 further includes two first attachment portions 222 fixedly attached respectively to the two side portions 212 and an extension 223 extending toward the second cleat securing member 30, and the adjustment mechanism 41 is movably attached to the extension 223. The first cleat securing member 22 further includes a second attachment portion 224 fixedly attached to the cylindrical portion 211.

Specifically, a plurality of fasteners (such as bolts) 50 detachably fixes the first cleat securing member 22 to the two side portions 212 at the two first attachment portions (such as holed structures) 222 and the second attachment portion (such as holed structure) 224. However, the first cleat securing member and the pedal body may be integrally formed of one piece. Preferably, the cylindrical portion 211 includes a plane 213, and a bottom face of the first cleat securing member 22 is abutted against the plane 213 in surface contact, thus improving structural strength and support steadiness of the first cleat securing member 22. Preferably, the extension 223 is relatively protrusive beyond the cylindrical portion 211, thus protecting the cylindrical portion 211 from damage by the cleat 101 or external impact.

The extension 223 includes a bore 225 and two wings 226 extending respectively toward the two side portions 212. The pedal body 21 includes a recess 214, and the adjustment mechanism 41 is a bolt and rotatably inserted within the bore 225. The biasing mechanism 40 further including a nut 43 non-rotatably slidably received within the recess 214 and screwed with and the bolt, for adjusting preload of the elastic member 42. The bolt and the extension 223 include engaging structures 411, 227 positionably engageable with each other, for preventing free rotation of the bolt after the bolt is adjusted. One end of the bolt away from the extension 223 includes a hole 412 such as hexagonal hole for receiving an adjustment tool such as hexagonal wrench, wherein the hole 412 is open toward a direction away from the extension 223 for preventing collection of dirt or the like thereinside. The wing 226 preferably includes an incline 228 extending slantly upwardly toward the side portion 212 and a distal end portion 229 relatively higher than a top face of the extension 223. The distance between the incline 228 and the second cleat securing member 30 reduces laterally outwardly, so when swinging laterally, the cleat 101 can push back the second cleat securing member 30 and be guided along the distal end portion 229 out from the second securing opening 31. Since the biasing mechanism 40 is attached to the fixed portion 20 but not attached directly to the second cleat securing member 30 which is rotatable, the adjustment mechanism 41 is not affected by impact during the cleat 101 being securing into or releasing from the second cleat securing member 30, thus preventing the adjustment mechanism from unexpected adjustment so that the preload is maintained. The two wings 226 not only protects the cylindrical portion 211 but also provides sufficient support for the cleat 101, and thus the cleat 101 is free of disengagement due to hard pedaling. Preferably, the recess 214 includes a preload index 215 on an inner face thereof, for indication of adjusting the biasing mechanism 40, such as directions of adjusting preload or scales of preload.

Figure 8:
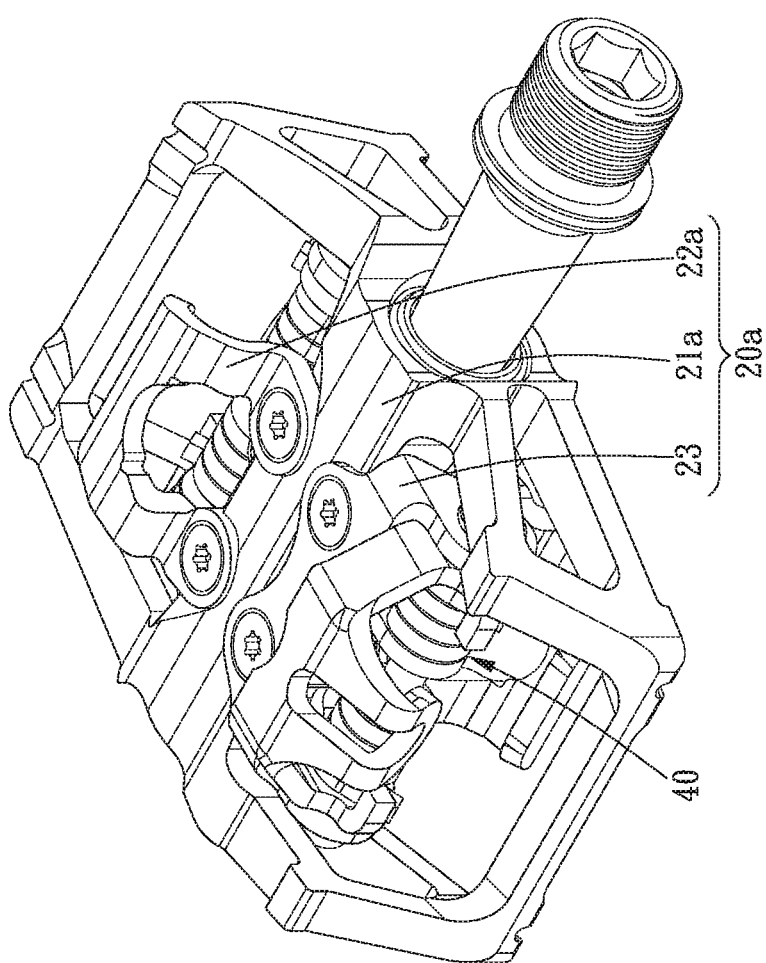
FIG. 8 is a perspective view of a bicycle pedal according to a second preferred embodiment of the present invention.
Figure 9:
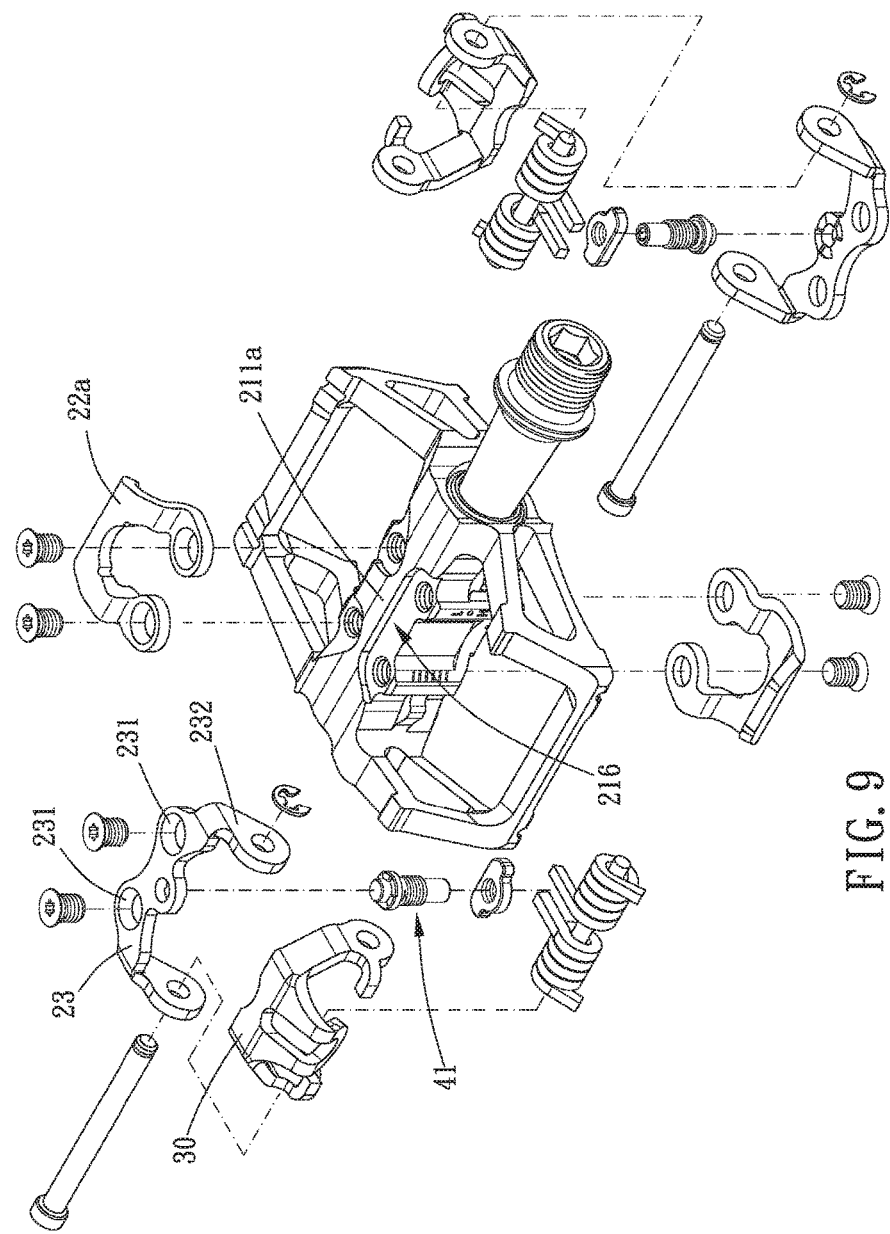
FIG. 9 is a breakdown drawing of the bicycle pedal according to the second preferable embodiment of the present invention.
Figure 10:
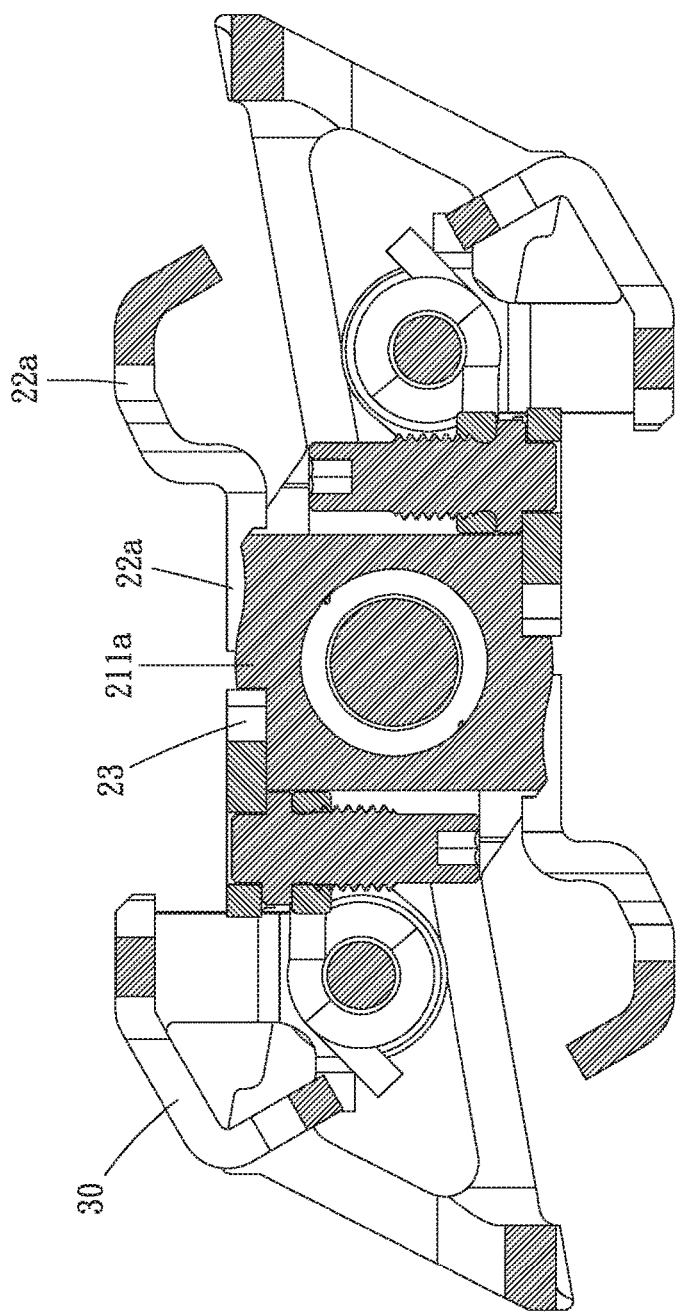
FIG. 10 is a cross-sectional view of the bicycle pedal according to the second preferable embodiment of the present invention.

FIGS. 8-10 show a bicycle pedal according to a second preferred embodiment of the present invention. In the second preferred embodiment, the fixed portion 20a further includes a mounting mechanism 23 fixedly attached to the pedal body 21a. The first cleat securing member 22a and the mounting mechanism 23 is engaged within engagement slots 216 disposed on two sides of the cylindrical portion 211a, the second cleat securing member 30 is rotatably mounted to the mounting mechanism 23, and the adjustment mechanism 41 is movably attached to the mounting mechanism 23. The mounting mechanism 23 includes two (at least one or more than two) attachment portions 231 (such as holed structure) fixedly attached to the cylindrical portion 211a, It is noted that the second cleat securing member and the pedal body may be integrally formed of one piece. Similarly, the adjustment mechanism is not affected by impact during the cleat being securing into or releasing from the second cleat securing member, thus preventing the adjustment mechanism from unexpected adjustment so that the preload is maintained. The mounting mechanism 23 includes two ear portions 232, the second cleat securing member 30 rotatably connected to the two ear portions 232, the biasing mechanism 40 is located between the two ear portions 232, thus facilitating mounting and protecting the biasing mechanism 40. At least one of a portion at which the first cleat securing member 22a and the pedal body 21a are fixedly connected and a portion at which the mounting mechanism 23 and the pedal body 21a are fixedly connected is relatively protrusive beyond the cylindrical portion 211a, thus preventing the cylindrical portion 211a from damage from the cleat or external impact.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle pedal, including:
a pedal axle;
a fixed portion, rotatably connected to the pedal axle, including a pedal body and a first cleat securing member fixedly attached to the pedal body, the first cleat securing member including a first securing opening;
a second cleat securing member, rotatably connected to the fixed portion, including a second securing opening opposite to the first securing opening, the first and second securing openings configured for securing a cleat of a shoe;
a biasing mechanism, including an adjustment mechanism movably attached to the fixed portion and an elastic member located between the second cleat securing member and the adjustment mechanism, the elastic member biasing the second cleat securing member;
wherein the pedal body includes a cylindrical portion and two side portions radially extending from two ends of the cylindrical portion, the first cleat securing member includes two first attachment portions fixedly attached respectively to the two side portions and an extension extending toward the second cleat securing member, and the adjustment mechanism is movably attached to the extension;
wherein the first cleat securing member further includes a second attachment portion fixedly attached to the cylindrical portion.

2. The bicycle pedal of claim 1, wherein the extension includes two wings extending respectively toward the two side portions.

3. The bicycle pedal of claim 2, wherein each of the two wings includes an incline extending slantly upwardly toward one of the two side portions and a distal end portion.

4. The bicycle pedal of claim 1, wherein the extension is protrusive radially beyond the cylindrical portion.

5. The bicycle pedal of claim 1, wherein the fixed portion further includes a mounting mechanism fixedly attached to the pedal body, the second cleat securing member is rotatably mounted to the mounting mechanism, and the adjustment mechanism is movably attached to the mounting mechanism.

6. The bicycle pedal of claim 5, wherein the pedal body includes a cylindrical portion and two side portions radially extending from two ends of the cylindrical portion, and the mounting mechanism includes at least one attachment portion fixedly attached to the cylindrical portion.

7. The bicycle pedal of claim 5, wherein the mounting mechanism includes two ear portions, and the second cleat securing member is rotatably connected to the two ear portions.

8. The bicycle pedal of claim 5, wherein the pedal body includes a cylindrical portion through which the pedal axle is disposed, a portion of the first cleat securing member fixedly disposed on the pedal body or a portion of the mounting mechanism fixedly disposed on the pedal body is protrusive radially beyond the cylindrical portion.

9. The bicycle pedal of claim 1, wherein the pedal body includes a recess, the adjustment mechanism is a bolt, the biasing mechanism further includes a nut non-rotatably slidably received within the recess and screwed with the bolt.

* * * * *